(12) United States Patent
Park et al.

(10) Patent No.: US 12,325,621 B2
(45) Date of Patent: Jun. 10, 2025

(54) DEVICE AND METHOD FOR CONTROLLING REFUELING OF HYDROGEN

(71) Applicants: HYUNDAI MOTOR COMPANY, Seoul (KR); KIA CORPORATION, Seoul (KR)

(72) Inventors: Ji Hye Park, Seoul (KR); Dae Nyung Lee, Suwon-si (KR); A Eun Yoon, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 167 days.

(21) Appl. No.: 18/122,838

(22) Filed: Mar. 17, 2023

(65) Prior Publication Data

US 2024/0140779 A1 May 2, 2024

(30) Foreign Application Priority Data

Oct. 31, 2022 (KR) .................. 10-2022-0142988

(51) Int. Cl.
| | | |
|---|---|---|
| B67D 7/04 | (2010.01) | |
| B67D 7/22 | (2010.01) | |
| F17C 5/00 | (2006.01) | |
| F17C 13/02 | (2006.01) | |

(52) U.S. Cl.
CPC .............. B67D 7/22 (2013.01); B67D 7/0401 (2013.01); F17C 5/007 (2013.01); F17C 13/025 (2013.01); B67D 2007/0453 (2013.01); F17C 2221/012 (2013.01); F17C 2250/032 (2013.01); F17C 2265/065 (2013.01)

(58) Field of Classification Search
CPC . B67D 7/04; B67D 7/348; B60L 53/66; F17C 13/025; F17C 2265/065
USPC ........................................ 235/94 R
See application file for complete search history.

(56) References Cited

U.S. PATENT DOCUMENTS

| | | | |
|---|---|---|---|
| 8,924,037 B2 | 12/2014 | Seymour et al. | |
| 10,800,281 B2 | 10/2020 | Boisen et al. | |
| 10,960,783 B2 | 3/2021 | Boisen et al. | |
| 2020/0276909 A1* | 9/2020 | Boisen | H04W 4/40 |
| 2020/0346554 A1 | 11/2020 | Boisen et al. | |
| 2022/0170597 A1* | 6/2022 | Saha | F17C 13/026 |

FOREIGN PATENT DOCUMENTS

| | | |
|---|---|---|
| CN | 111828832 A | 10/2020 |
| JP | 2021-028504 A | 2/2021 |
| JP | 2022-518615 A | 3/2022 |
| KR | 2015-0069729 A | 6/2015 |
| KR | 2022-0037573 A | 3/2022 |
| KR | 2022-0087004 A | 6/2022 |

* cited by examiner

Primary Examiner — Paultep Savusdiphol
(74) Attorney, Agent, or Firm — MCDONNELL BOEHNEN HULBERT & BERGHOFF LLP (57) ABSTRACT

A device for controlling refueling of hydrogen includes one or more hydrogen refueling facilities for refueling a hydrogen-powered vehicle with hydrogen, and a controller that collects state information and control data of the hydrogen refueling facilities, performs artificial intelligence learning based on the state information and the control data, and controls operations of the hydrogen refueling facilities based on the learning result.

20 Claims, 8 Drawing Sheets

DEVICE AND METHOD FOR CONTROLLING REFUELING OF HYDROGEN

CROSS REFERENCE TO RELATED APPLICATIONS

This application claims the benefit of priority to Korean Patent Application No. 10-2022-0142988, filed in the Korean Intellectual Property Office on Oct. 31, 2022, the entire contents of which are incorporated herein by reference.

TECHNICAL FIELD

The present disclosure relates to a device and a method for controlling refueling of hydrogen.

BACKGROUND

A hydrogen refueling station may include apparatuses such as a tube trailer, a compressor, a storage tank, a cooler, a dispenser, and a hydrogen refueling controller to supply hydrogen to a hydrogen-electric vehicle. The hydrogen refueling controller controls operation of the compressor, the storage tank, the cooler, the dispenser, and the like based on an input of an operator.

The hydrogen refueling controller may operate the hydrogen compressor to fill the storage tank when a residual pressure of the storage tank is equal to or lower than a certain pressure, and allow hydrogen stored in the storage tank to be output to the hydrogen-electric vehicle via the dispenser. When certain equipment malfunctions or an error occurs during such process, the hydrogen refueling controller is not able to handle the malfunction or the error by itself, and outputs an alarm to allow the operator to check the malfunction or the error.

However, when the operator lacks experience in the hydrogen refueling station or an unpredictable and unexpected situation occurs, the hydrogen-electric vehicle is not smoothly refueled with hydrogen because of poor handling of the operator, which causes inconvenience to a customer.

SUMMARY

The present disclosure has been made to solve the above-mentioned problems occurring in the prior art while advantages achieved by the prior art are maintained intact.

An aspect of the present disclosure provides a device and a method for controlling refueling of hydrogen that may operate and manage all facilities in a refueling station, such as a compressor, a storage tank, a cooler, a dispenser, and the like in the hydrogen refueling station, in a unified manner.

Another aspect of the present disclosure provides a device and a method for controlling refueling of hydrogen that may predict a time point at which a hydrogen refueled amount is maximum and respond quickly even when an unexpected situation occurs.

Another aspect of the present disclosure provides a device and a method for controlling refueling of hydrogen that may automatically inspect facilities at time points at which a hydrogen refueled amount is not maximum, and perform maintenance when performances of the facilities are poor.

Another aspect of the present disclosure provides a device and a method for controlling refueling of hydrogen that may systematize operation by analyzing operation data such as an operation pattern and a hydrogen refueled amount for each period and each time of each facility of a hydrogen refueling station.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for controlling refueling of hydrogen includes one or more hydrogen refueling facilities for refueling a hydrogen-powered vehicle with hydrogen, and a controller that collects state information and control data of the hydrogen refueling facilities, performs artificial intelligence learning based on the state information and the control data, and controls operations of the hydrogen refueling facilities based on the learning result.

In one implementation, the controller may include a communication device for receiving the state information sensed by sensors equipped in the hydrogen refueling facilities and the control data of the hydrogen refueling facilities, an input device for receiving an input of an operator, an output device for outputting a guide message to the operator, storage for storing the control data of the hydrogen refueling facilities, and a control device for performing the artificial intelligence learning based on the state information and the control data.

In one implementation, the hydrogen refueling facilities may include a compressor for compressing hydrogen output from a tube trailer for supplying hydrogen, a storage container for storing compressed hydrogen output from the compressor, a cooler for cooling hydrogen stored in the storage container, and a dispenser for outputting cooled hydrogen to the hydrogen-powered vehicle.

In one implementation, the controller may derive an operating schedule of the hydrogen refueling facilities based on the learning result, and output the operating schedule to the operator.

In one implementation, the controller may predict a pressure of a tube trailer based on the operating schedule, predict a time point when the pressure of the tube trailer is lower than a preset tube trailer replacement required pressure as a replacement time point, and output a guide message requesting that a new tube trailer is supplied at the replacement time point.

In one implementation, the controller may update the operating schedule based on the control data generated in a process of refueling the hydrogen-powered vehicle with hydrogen output from the new tube trailer when it is determined that the tube trailer is replaced with the new tube trailer.

In one implementation, the controller may predict inspection time points of the hydrogen refueling facilities based on the operating schedule, and output a maintenance request message to a manufacturer of each the hydrogen refueling facilities when it is determined that replacement of the hydrogen refueling facilities is necessary after performing inspection at the inspection time points.

In one implementation, the controller may receive maintained items from the manufacturer of each of the hydrogen refueling facilities, and update inspection items of the hydrogen refueling facilities based on the maintained items.

In one implementation, the controller may output a message indicating the inspection results when it is determined that the inspection items of the hydrogen refueling facilities have been updated.

In one implementation, the controller may collect a hydrogen refueled amount refueled to the hydrogen-powered vehicle for each unit period, and generate a refueling demand pattern based on the collected hydrogen refueled amount information.

In one implementation, the controller may predict a time point when the hydrogen refueled amount is maximum based on the refueling demand pattern, and predict time points included in time points excluding the time point when the hydrogen refueled amount is maximum as inspection time points of the hydrogen refueling facilities.

According to another aspect of the present disclosure, a method for controlling refueling of hydrogen includes collecting, by a controller, state information and control data of one or more hydrogen refueling facilities for refueling a hydrogen-powered vehicle with hydrogen, and performing, by the controller, artificial intelligence learning based on the state information and the control data, and controlling operations of the hydrogen refueling facilities based on the learning result.

In one implementation, the method may further include deriving, by the controller, an operating schedule of the hydrogen refueling facilities based on the learning result, and outputting the operating schedule to an operator.

In one implementation, the method may further include predicting, by the controller, a pressure of a tube trailer based on the operating schedule, predicting, by the controller, a time point when the pressure of the tube trailer is lower than a preset tube trailer replacement required pressure as a replacement time point, and outputting, by the controller, a guide message requesting that a new tube trailer is supplied at the replacement time point.

In one implementation, the method may further include updating, by the controller, the operating schedule based on the control data generated in a process of refueling the hydrogen-powered vehicle with hydrogen output from the new tube trailer when it is determined that the tube trailer is replaced with the new tube trailer.

In one implementation, the method may further include predicting, by the controller, inspection time points of the hydrogen refueling facilities based on the operating schedule, and outputting, by the controller, a maintenance request message to a manufacturer of each the hydrogen refueling facilities when it is determined that replacement of the hydrogen refueling facilities is necessary after performing inspection at the inspection time points.

In one implementation, the method may further include receiving, by the controller, maintained items from the manufacturer of each of the hydrogen refueling facilities, and updating inspection items of the hydrogen refueling facilities based on the maintained items.

In one implementation, the method may further include outputting, by the controller, a message indicating the inspection results when it is determined that the inspection items of the hydrogen refueling facilities have been updated.

In one implementation, the method may further include collecting, by the controller, a hydrogen refueled amount refueled to the hydrogen-powered vehicle for each unit period, and generating a refueling demand pattern based on the collected hydrogen refueled amount information.

In one implementation, the method may further include predicting, by the controller, a time point when the hydrogen refueled amount is maximum based on the refueling demand pattern, and predicting time points included in time points excluding the time point when the hydrogen refueled amount is maximum as inspection time points of the hydrogen refueling facilities.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
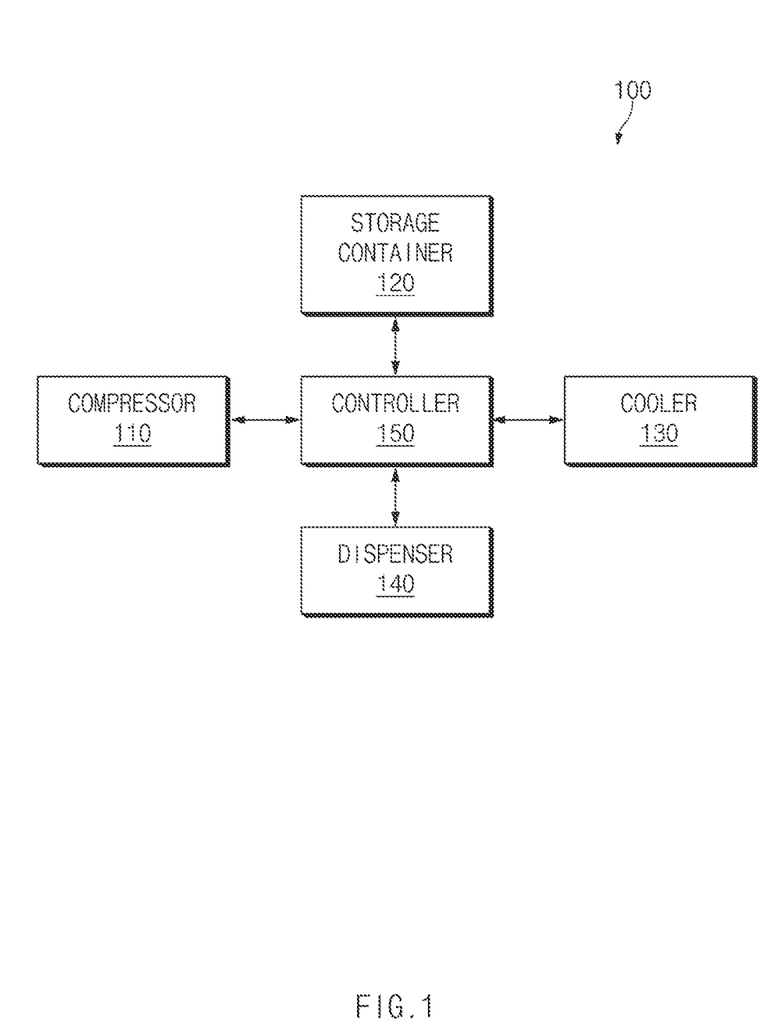
FIG. 1 is a diagram illustrating a configuration of a hydrogen refueling control device according to an embodiment of the present disclosure.

FIG. 1 is a diagram illustrating a configuration of a hydrogen refueling control device according to an embodiment of the present disclosure. A hydrogen refueling control device 100 according to an embodiment of the present disclosure may include one or more hydrogen refueling facilities for refueling a hydrogen-powered vehicle (a hydrogen-electric vehicle) with hydrogen, and the hydrogen refueling facilities may include a compressor, a storage container, a cooler, a dispenser, a controller, and the like. According to an embodiment, the hydrogen refueling facilities may be connected to each other via one or more pipes to output compressed and cooled hydrogen to the hydrogen-powered vehicle.

According to an embodiment, as shown in FIG. 1, the hydrogen refueling control device 100 may include a compressor 110, a storage container 120, a cooler 130, a dispenser 140, and a controller 150. Although not shown, the hydrogen refueling control device 100 may further include a priority control panel that selects one of a plurality of storage containers and controls hydrogen output to the dispenser 140.

The compressor 110 may compress hydrogen output from a tank trailer (not shown) for supplying hydrogen at a high pressure so as to be stored in the storage container 120 and output compressed hydrogen. The compressor 110 may compress hydrogen at different pressures (e.g., a first pressure to an nth pressure) based on control of the controller 150.

The storage container 120 may store hydrogen output from the compressor. The storage container 120 may include a plurality of storage containers capable of storing hydrogen compressed at the different pressures to store hydrogen compressed at the different pressures. The storage container 120 may use a composite pressure vessel for light weight, and the composite pressure vessel may be implemented by impregnating carbon fiber with an epoxy resin, then winding the carbon fiber on a liner made of aluminum or plastic, and then curing the resin.

The storage container 120 may include a pressure sensor capable of sensing the pressure of hydrogen introduced into the storage container, and may transmit the pressure of hydrogen introduced into the storage container measured by the pressure sensor to the controller 150. When the hydrogen pressure of the storage container 120 is lower than a preset pressure, the controller 150 may control the compressor 110 to compress hydrogen, and allow the compressor 110 to output compressed hydrogen, so that the pressure of hydrogen in the storage container 120 is maintained at a pressure equal to or higher than the preset pressure.

The cooler 130 may cool hydrogen to stably output hydrogen compressed in the storage container 120 to the hydrogen-powered vehicle. According to an embodiment, the cooler 130 may include a temperature sensor capable of sensing a temperature of hydrogen inside the cooler, and may transmit the temperature measured by the temperature sensor to the controller 150. Although not shown, the cooler 130 may be connected to a heat exchanger and may output a refrigerant cooled in the cooler 130 to the heat exchanger, and the heat exchanger may output cooled hydrogen to the dispenser 140.

The dispenser 140 may output hydrogen cooled by the cooler 130 to the hydrogen-powered vehicle. The dispenser 140 may output cooled hydrogen to the hydrogen-powered vehicle under the control of the controller 150, and the dispenser 140 may transmit a hydrogen refueled amount output to the hydrogen-powered vehicle to the controller 150.

The controller 150 may control overall operations of the hydrogen refueling control device according to an embodiment of the present disclosure, and the controller 150 may be electrically connected to the compressor 110, the cooler 130, the dispenser 140, and the like via cables or various circuits to transmit electrical signals including control commands or the like and may transmit and receive the electrical signals including the control commands or the like by various wireless communication networks. A more detailed description of the controller 150 will be made with reference to FIG. 2.

Figure 2:
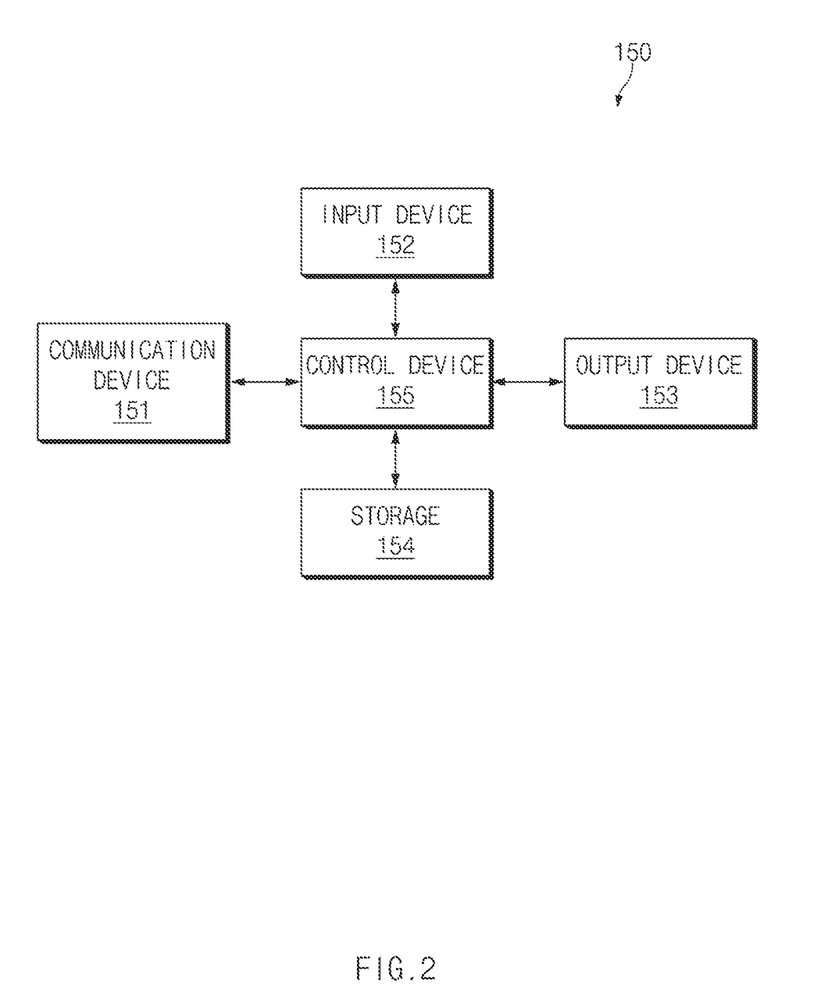
FIG. 2 is a diagram illustrating a configuration of a hydrogen refueling controller according to an embodiment of the present disclosure.

FIG. 2 is a diagram illustrating a configuration of a hydrogen refueling controller according to an embodiment of the present disclosure.

As shown in FIG. 2, the controller 150 may include a communication device 151, an input device 152, an output device 153, storage 154, and a control device 155.

The communication device 151 may perform wireless or wired communication to communicate with the hydrogen refueling facilities. In addition, the communication device 151 may perform the wireless or wired communication to communicate with an external electronic device (a hydrogen supplier, a refueling facility manufacturer, and the like). In addition, the communication device 151 may perform the wireless communication with a payment server for payment of costs for hydrogen supply and for payment of costs for replacement and maintenance of the hydrogen refueling facilities. The communication device 151 may receive state information and control data from the hydrogen refueling facilities. According to an embodiment, the wireless communication may, for example, use at least one of a long term evolution (LTE), a long term evolution-advanced (LTE-A), a 5th generation wireless system (5G), an mm-wave or 60 GHz wireless communication, a wireless USB, a code division multiple access (CDMA), a wideband code division multiple access (WCDMA), a universal mobile telecommunications system (UMTS), a wireless broadband (WiBro), or a global system for mobile communications (GSM), and the wired connection may include at least one of a universal serial bus (USB), a high-definition multimedia interface (HDMI), a recommended standard (RS-232), or a plain old telephone service (POTS).

The input device 152 may receive an input of an operator. According to an embodiment, the input device 152 may include touch input means or mechanical input means.

The output device 153 may output a guide message to the operator. According to an embodiment, the output device 153 may include a display device and an audio output device, and the display device may be integrally implemented with the input device 152. The audio output device may include a speaker or the like.

The storage 154 may store the state information and the control data received from the hydrogen refueling facilities. In addition, the storage 154 may store at least one algorithm for operating or executing various commands for an operation of the controller 150 according to one embodiment of the present disclosure. The storage 154 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The control device 155 may be implemented by various processing devices such as a microprocessor or the like having a built-in semiconductor chip capable of performing the operation or the execution of the various commands, and may control the operation of the controller according to one embodiment of the present disclosure.

According to an embodiment, the control device 155 may perform artificial intelligence learning based on the state information and the control data received from the hydrogen refueling facilities. The control device 155 may be electrically connected to the communication device 151, the input device 152, the output device 153, and the storage 154 via cables or various circuits to transmit electrical signals including control commands or the like and may transmit and receive the electrical signals including the control commands or the like by various wireless communication networks such as a controller area network (CAN). A more detailed description will be made with reference to FIGS. 3 and 4.

Figure 3:
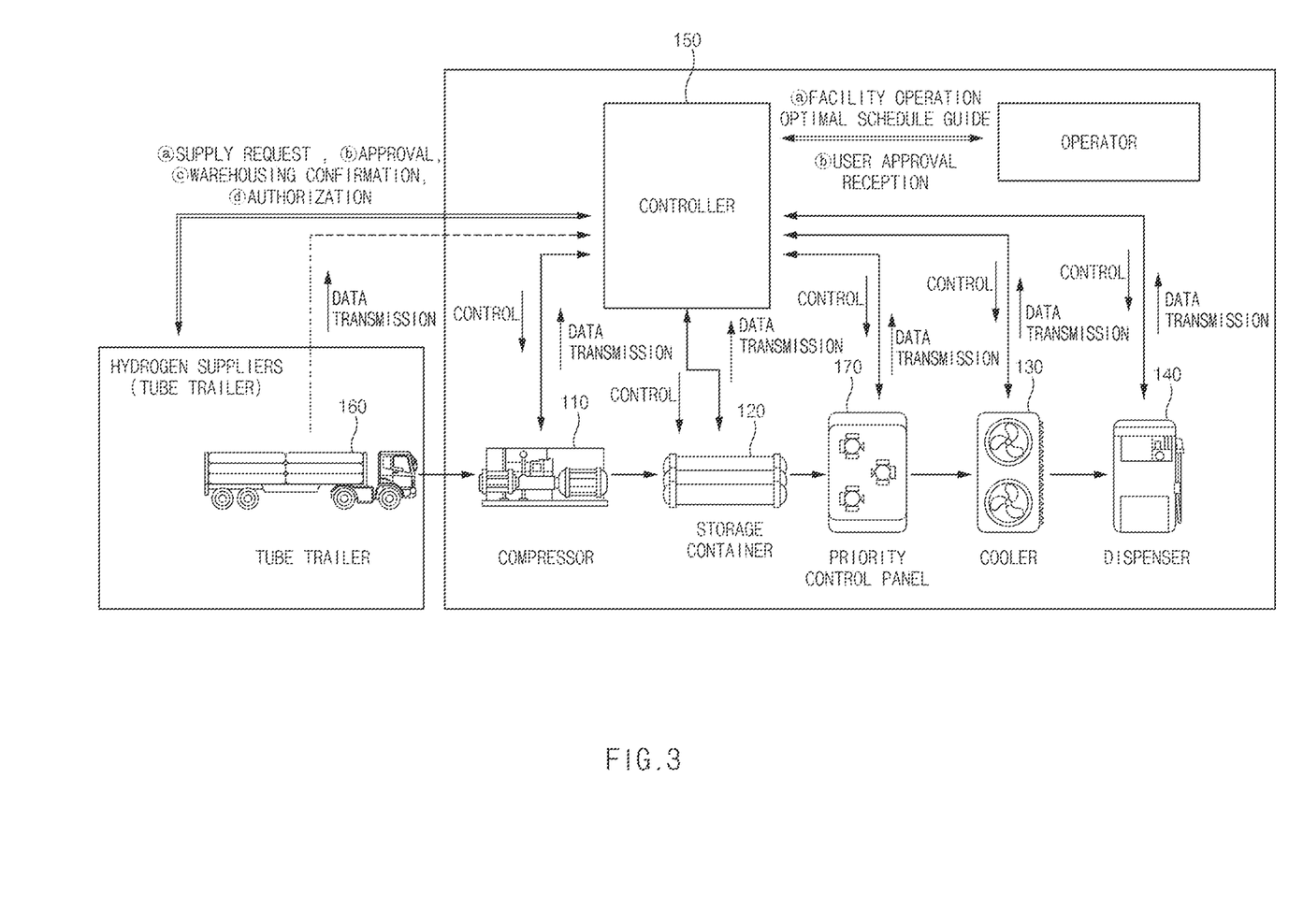
FIG. 3 is a diagram schematically illustrating a hydrogen refueling control method according to an embodiment of the present disclosure.

FIG. 3 is a diagram schematically illustrating a hydrogen refueling control method according to an embodiment of the present disclosure.

As shown in FIG. 3, the controller 150 may collect the control data of the hydrogen refueling facilities. According to an embodiment, the controller 150 may collect the control data obtained as the controller 150 controls operations of the compressor 110, the storage container 120, the cooler 130, the dispenser 140, a priority control panel 170, and the like. For example, the control data may include control information for controlling the compressor 110 to compress hydrogen and output compressed hydrogen to the storage container 120 when the hydrogen pressure in the storage container 120 is equal to or lower than the preset pressure. In addition, the controller 150 may receive data including pressure information from a tube trailer 160 and monitor the data received from the tube trailer 160.

The controller 150 may collect the state information of the hydrogen refueling facilities. According to an embodiment, the controller 150 may collect the state information obtained from the sensors equipped in the hydrogen refueling facilities. In this regard, the state information may include the hydrogen pressure in the storage container 120, the temperature of hydrogen cooled in the cooler 130, the hydrogen refueled amount output to the hydrogen-powered vehicle via the dispenser 140, and the like.

The controller 150 may perform the artificial intelligence learning based on the collected state information and control data, derive an operating schedule of the hydrogen refueling facilities based on the learned results, and output the derived operating schedule to the output device 153. According to an embodiment, the controller 150 may learn a time point for controlling the compressor 110 to maintain the preset hydrogen pressure in the storage container 120, a time point for cooling hydrogen, a time point at which a user requested refueling, and the like, and derive the operating schedule containing a time point for controlling the refueling facilities including the compressor 110, the storage container 120, the cooler 130, the dispenser 140, and the like based on the learned results.

The controller 150 may output the operating schedule via the output device 153, and may control the operation of the hydrogen refueling facilities based on the operating schedule when it is determined that there is a response of the operator (a signal received by the input device by the input of the operator) corresponding to the output of the operating schedule.

The controller 150 may set a replacement required pressure of the tube trailer for supplying hydrogen to the compressor 110, and predict a pressure of the tube trailer based on the operating schedule. The controller 150 may predict a time point at which the predicted pressure of the tube trailer is lower than the preset replacement required pressure as a replacement time point of the tube trailer.

The controller 150 may output the guide message via the output device 153 such that a new tube trailer may be supplied at the replacement time point. According to an embodiment, the controller 150 may not only output the guide message via the output device 153 such that the new tube trailer may be supplied at the predicted replacement time point, but also output a message directly requesting the supply of the new tube trailer to a supplier for supplying hydrogen.

When determining that there is the response of the operator (the signal received by the input device by the input of the operator) corresponding to the guide message, the controller 150 may determine that the operator has agreed to the new trailer supply, and then determine whether the tube trailer is replaced with the new tube trailer. In addition, even when there is no response from the operator corresponding to the guide message, because the controller 150 outputs the message directly requesting the supply of the new tube trailer at the predicted replacement time point to the supplier for supplying hydrogen, the controller 150 may allow the supply of the new tube trailer to be performed smoothly.

Therefore, according to an embodiment of the present disclosure, the controller 150 does not request the supply of the new tube trailer at the time point at which the pressure of the tube trailer is lower than the preset replacement required pressure, but predicts the pressure of the tube trailer in advance based on the operating schedule, predicts the replacement time point of the tube trailer, and requests that the new tube trailer is supplied at the predicted replacement time point. Because the controller 150 may ensure that the new tube trailer is supplied at the predicted replacement time point, the controller 150 may allow the tube trailer to be immediately replaced with the new tube trailer at the time point at which the pressure of the tube trailer is lower than the preset replacement required pressure, so that only a time period during which the tube trailer is replaced with the new tube trailer is a time period during which the refueling facilities are not able to be operated, thereby minimizing the time period during which the refueling facilities are not able to be operated.

That is, the controller 150 may reduce an existing situation in which the refueling facilities are not able to be operated as much as a time period during which the operator determines whether the pressure of the tube trailer is lower than the replacement required pressure set in advance and requests the supply of the new tube trailer at the time point at which the pressure of the tube trailer is lower than the preset replacement required pressure, the new tube trailer is warehoused, and the tube trailer is replaced with the new tube trailer, thereby minimizing inconvenience of a customer waiting for the hydrogen refueling.

When it is determined that the tube trailer is replaced with the new tube trailer, the controller 150 may make a request for payment of costs based on the new tube trailer supply to the payment server.

When it is determined that the tube trailer is replaced with the new tube trailer, the controller 150 may update the operating schedule based on the control data generated in the process of refueling hydrogen output from the new tube trailer to the hydrogen-powered vehicle.

Figure 4:
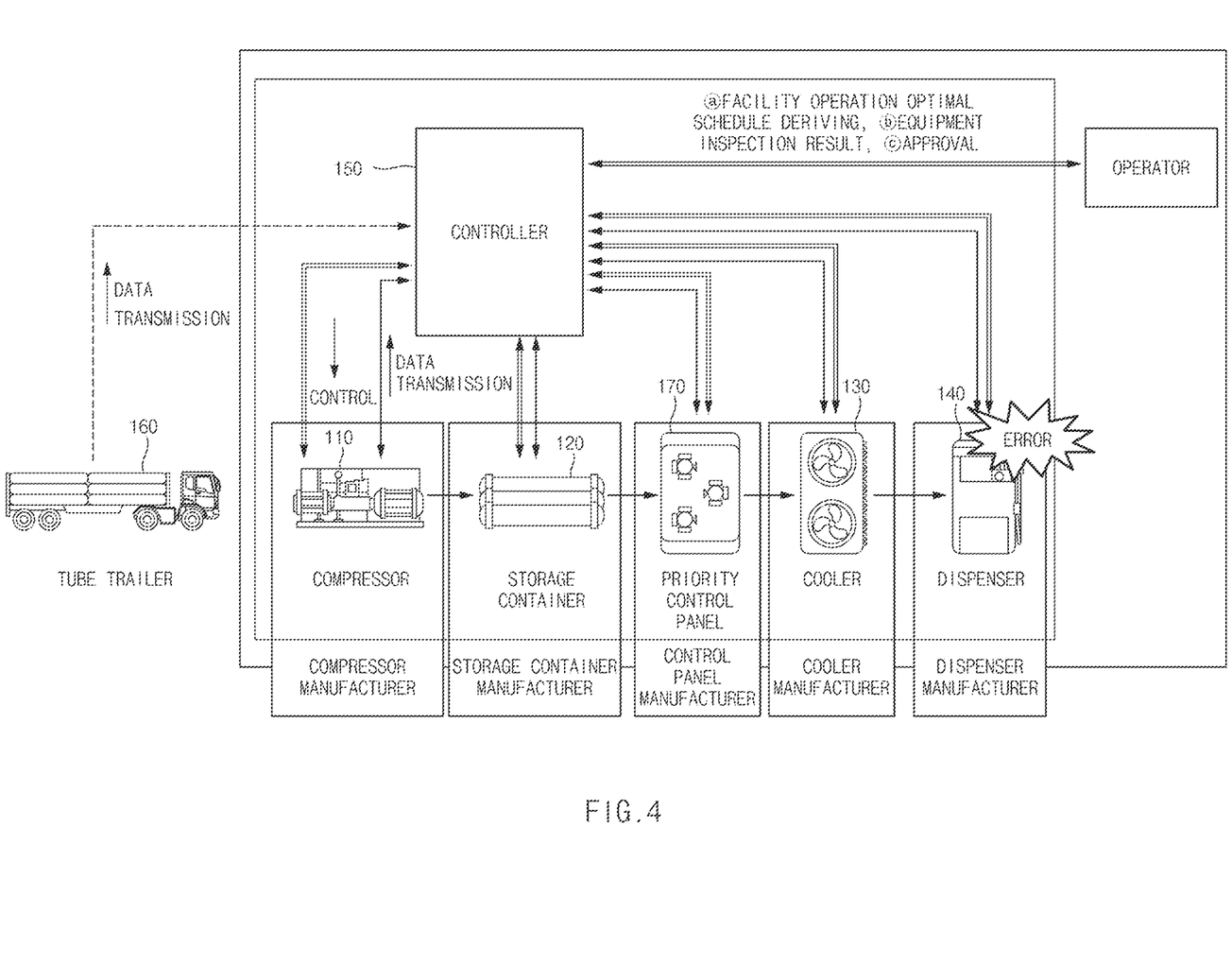
FIG. 4 is a diagram schematically illustrating a hydrogen refueling control method according to another embodiment of the present disclosure.

FIG. 4 is a diagram schematically illustrating a hydrogen refueling control method according to another embodiment of the present disclosure.

As shown in FIG. 4, the controller 150 may collect the hydrogen refueled amount refueled to the hydrogen-powered vehicle via the dispenser 140 for each unit period. According to an embodiment, the controller 150 may determine an amount of hydrogen output via the dispenser 140 as the hydrogen refueled amount. For example, the controller 150 may calculate a hydrogen refueled amount for each day, a hydrogen refueled amount for each month, or a hydrogen refueled amount for each year.

The controller 150 may perform the artificial intelligence learning on the hydrogen refueled amount collected for each unit period, and may generate (predict) a refueling demand pattern based on the artificial intelligence learning results. The controller 150 may predict a time point (e.g., a peak time point) at which the hydrogen refueled amount is maximum based on the refueling demand pattern, and predict time points included in time points other than the time point at which the hydrogen refueled amount is maximum as inspection time points of the hydrogen refueling facilities. In addition, the controller 150 may predict the inspection time points of the hydrogen refueling facilities based on the operating schedule.

The controller 150 may allow inspection to be performed at the predicted inspection time points. Therefore, the controller 150 may allow failures of the hydrogen refueling facilities to be predicted in advance by inspecting performances of the hydrogen refueling facilities in advance at time points at which demand for the hydrogen refueling is not concentrated.

When it is determined that the failures of the hydrogen refueling facilities have occurred and the hydrogen refueling facilities need to be replaced after inspecting the hydrogen refueling facilities, the controller 150 may output a maintenance request message to a manufacturer of each hydrogen refueling facility. Thus, the controller 150 may allow the maintenance of the hydrogen refueling facilities to be performed proactively.

Thereafter, when it is determined that the maintenance is completed by the manufacturer, the controller 150 may make a request for maintained items to the manufacturer and receive the maintained items from the manufacturer. The controller 150 may update inspection items of the facilities based on the maintained items, and then the controller 150 may allow the inspection to be performed based on the updated inspection items.

In addition, the controller 150 may output a message for indicating the inspection results via the output device 153.

When it is determined that errors have occurred in the hydrogen refueling facilities during the inspection at the predicted inspection time points, the controller 150 may directly make a request for the maintenance to the manufacturer by outputting the maintenance request message to the manufacturer of each hydrogen refueling facility.

Therefore, the controller 150 may reduce an existing situation in which the refueling facilities are not able to be operated as much as a time period during which the operator determines whether the operator is able to solve the errors of the hydrogen refueling facilities from the time point at which the errors have occurred in the hydrogen refueling facilities, and the operator make a request for the maintenance to the manufacturer of each hydrogen refueling facility when it is determined that the operator is not able to solve the errors of the hydrogen refueling facilities.

Thereafter, when it is determined that the maintenance is completed by the manufacturer, the controller 150 may make a request for the maintained items to the manufacturer and receive the maintained items from the manufacturer. The controller 150 may update the inspection items of the facilities based on the maintained items, and then the controller 150 may allow the inspection to be performed based on the updated inspection items.

In addition, the controller 150 may output the message for indicating the inspection results via the output device 153.

Figure 5:
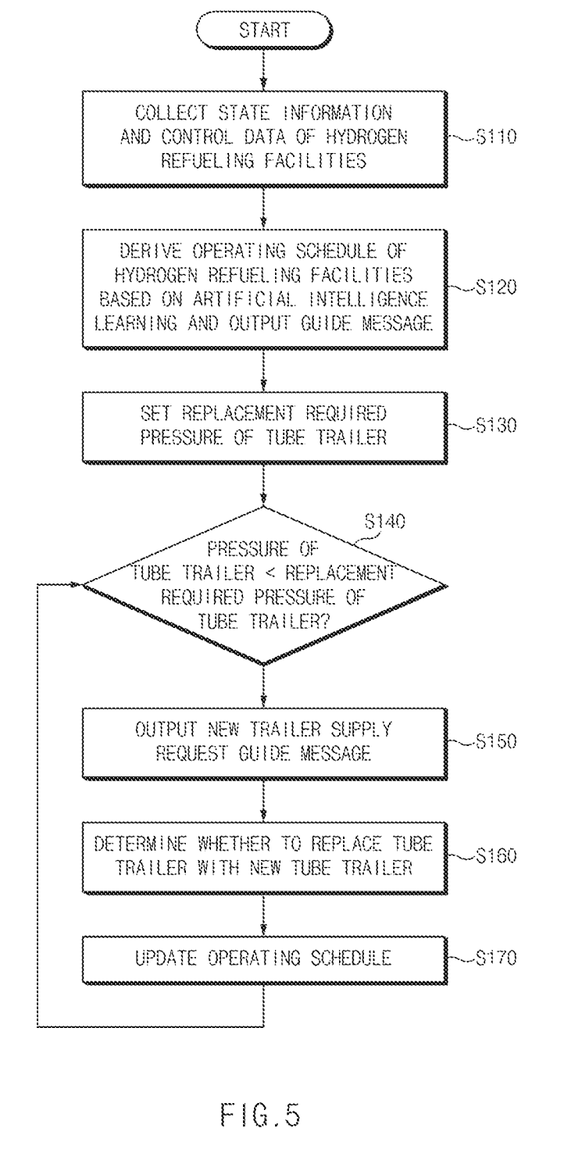
FIG. 5 is a flowchart illustrating a hydrogen refueling control method according to an embodiment of the present disclosure.

FIG. 5 is a flowchart illustrating a hydrogen refueling control method according to an embodiment of the present disclosure.

As shown in FIG. 5, the controller 150 may collect the state information and the control data of the hydrogen refueling facilities at S110.

According to an embodiment, in S110, the controller 150 may collect the state information obtained from the sensors equipped in the hydrogen refueling facilities. In this regard, the state information may include the hydrogen pressure in the storage container 120, the temperature of hydrogen cooled in the cooler 130, the hydrogen refueled amount output to the hydrogen-powered vehicle via the dispenser 140, and the like.

According to an embodiment, in S110, the controller 150 may collect the control data obtained as the controller 150 controls the operations of the compressor 110, the storage container 120, the cooler 130, the dispenser 140, the priority control panel 170, and the like. For example, the control data may include the control information for controlling the compressor 110 to compress hydrogen and output compressed hydrogen to the storage container 120 when the hydrogen pressure in the storage container 120 is lower than the preset pressure.

According to an embodiment, in S110, the controller 150 may receive the data including the pressure information from the tube trailer 160 and monitor the data received from the tube trailer 160.

The controller 150 may perform the artificial intelligence learning based on the collected state information and control data, derive the operating schedule of the hydrogen refueling facilities based on the learned results, and output the derived operating schedule to the output device 153 at S120.

According to an embodiment, in S120, the controller 150 may learn the time point for controlling the compressor 110 to maintain the preset hydrogen pressure in the storage container 120, the time point for cooling hydrogen, the time point at which the user requested the refueling, and the like, and derive the operating schedule containing the time point for controlling the refueling facilities including the compressor 110, the storage container 120, the cooler 130, the dispenser 140, and the like based on the learned results.

According to an embodiment, in S120, the controller 150 may output the operating schedule via the output device 153, and may control the operation of the hydrogen refueling facilities based on the operating schedule when it is determined that there is the response of the operator (the signal received by the input device by the input of the operator) corresponding to the output of the operating schedule.

The controller 150 may set the replacement required pressure of the tube trailer for supplying hydrogen to the compressor 110 at S130.

According to an embodiment, in S130, the controller 150 may predict the pressure of the tube trailer based on the operating schedule, and compare the predicted pressure of the tube trailer with the preset replacement required pressure.

The controller 150 may determine whether the predicted pressure of the tube trailer is lower than the preset replacement required pressure at S140.

According to an embodiment, in S140, the controller 150 may predict the time point at which the predicted pressure of the tube trailer is lower than the preset replacement required pressure as the replacement time point of the tube trailer.

The controller 150 may output the guide message via the output device 153 such that the new tube trailer may be supplied at the replacement time point at S150.

According to an embodiment, in S150, the controller 150 may not only output the guide message via the output device 153 such that the new tube trailer may be supplied at the predicted replacement time point, but also output the message directly requesting the supply of the new tube trailer to the supplier for supplying hydrogen.

According to an embodiment, in S150, when determining that there is the response of the operator (the signal received by the input device by the input of the operator) corresponding to the guide message, the controller 150 may determine that the operator has agreed to the new trailer supply.

According to an embodiment, in S150, even when there is no response from the operator corresponding to the guide message, because the controller 150 outputs the message directly requesting the supply of the new tube trailer at the predicted replacement time point to the supplier for supplying hydrogen, the controller 150 may allow the supply of the new tube trailer to be performed smoothly.

The controller 150 may determine whether the tube trailer is replaced with the new tube trailer at S160.

When it is determined that the tube trailer is replaced with the new tube trailer, the controller 150 may make a request for the payment of the costs based on the new tube trailer supply to the payment server, and update the operating schedule based on the control data generated in the process of refueling hydrogen output from the new tube trailer to the hydrogen-powered vehicle at S170.

As described above, because the controller 150 may ensure that the new tube trailer is supplied at the predicted replacement time point, the controller 150 may allow the tube trailer to be immediately replaced with the new tube trailer at the time point at which the pressure of the tube trailer is lower than the preset replacement required pressure, so that only the time period during which the tube trailer is replaced with the new tube trailer is the time period during which the refueling facilities are not able to be operated, thereby minimizing the time period during which the refueling facilities are not able to be operated.

That is, the controller 150 may reduce the existing situation in which the refueling facilities are not able to be operated as much as the time period during which the operator determines whether the pressure of the tube trailer is lower than the replacement required pressure set in advance and requests the supply of the new tube trailer at the time point at which the pressure of the tube trailer is lower than the preset replacement required pressure, the new tube trailer is warehoused, and the tube trailer is replaced with the new tube trailer, thereby minimizing the inconvenience of the customer waiting for the hydrogen refueling.

Figure 6:
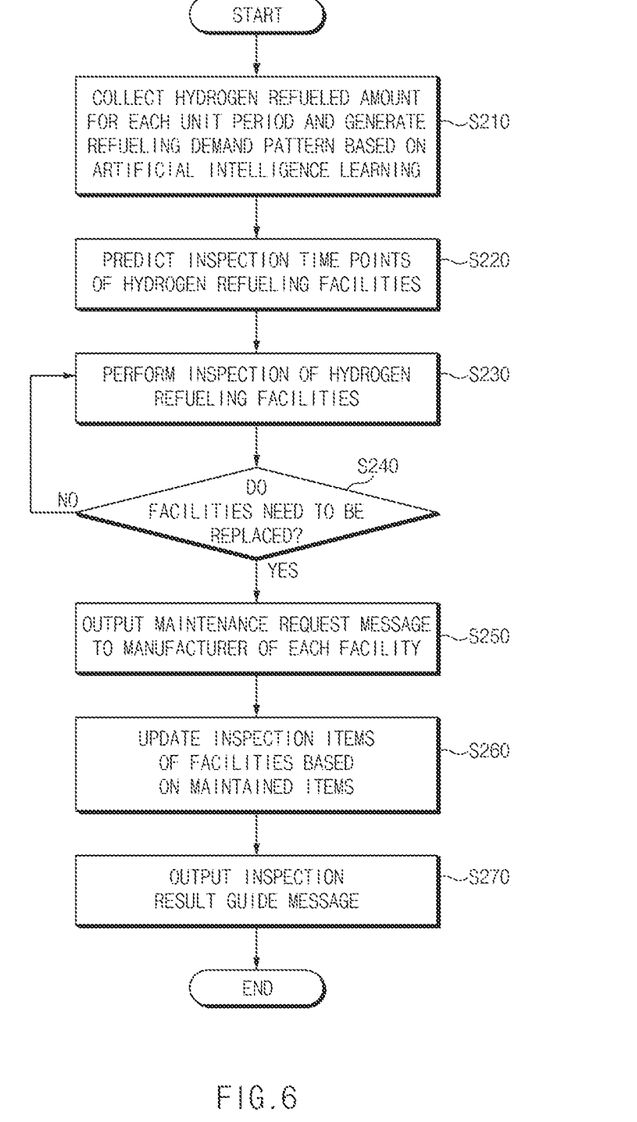
FIG. 6 is a flowchart illustrating a hydrogen refueling control method according to another embodiment of the present disclosure.

FIG. 6 is a flowchart illustrating a hydrogen refueling control method according to another embodiment of the present disclosure.

As shown in FIG. 6, the controller 150 may collect the hydrogen refueled amount refueled to the hydrogen-powered vehicle via the dispenser 140 for each unit period, and generate (predict) the refueling demand pattern based on the artificial intelligence learning results at S210.

According to an embodiment, in S210, the controller 150 may determine the amount of hydrogen output via the dispenser 140 as the hydrogen refueled amount. For example, the controller 150 may calculate the hydrogen refueled amount for each day, the hydrogen refueled amount for each month, or the hydrogen refueled amount for each year.

According to an embodiment, in S210, the controller 150 may perform the artificial intelligence learning on the hydrogen refueled amount collected for each unit period, and may generate (predict) the refueling demand pattern based on the artificial intelligence learning results.

The controller 150 may predict the inspection time points of the hydrogen refueling facilities based on the refueling demand pattern at S220.

According to an embodiment, in S220, the controller 150 may predict the time point (e.g., the peak time point) at which the hydrogen refueled amount is maximum based on the refueling demand pattern, and predict the time points included in the time points other than the time point at which the hydrogen refueled amount is maximum as the inspection time points of the hydrogen refueling facilities. However, the present disclosure may not be limited thereto, and the controller 150 may predict the inspection time points of the hydrogen refueling facilities based on the operating schedule.

The controller 150 may allow the inspection to be performed at the predicted inspection time points at S230. Therefore, in S230, the controller 150 may allow the failures of the hydrogen refueling facilities to be predicted in advance by inspecting the performances of the hydrogen refueling facilities in advance at time points at which the demand for the hydrogen refueling is not concentrated.

After performing the inspection of the hydrogen refueling facilities, the controller 150 may determine whether the failures of the hydrogen refueling facilities have occurred and the hydrogen refueling facilities need to be replaced at S240.

When it is determined in S240 that the hydrogen refueling facilities need to be replaced, the controller 150 may output the maintenance request message to the manufacturer of each hydrogen refueling facility at S250. Thus, the controller 150 may allow the maintenance of the hydrogen refueling facilities to be performed proactively.

When it is determined that the maintenance is completed by the manufacturer, the controller 150 may make a request for the maintained items to the manufacturer, receive the maintained items from the manufacturer, and update the inspection items of the facilities based on the maintained items at S260. In S260, the controller 150 may allow the inspection to be performed based on the updated inspection items.

The controller 150 may output the message for indicating the inspection results via the output device 153 at S270.

Figure 7:
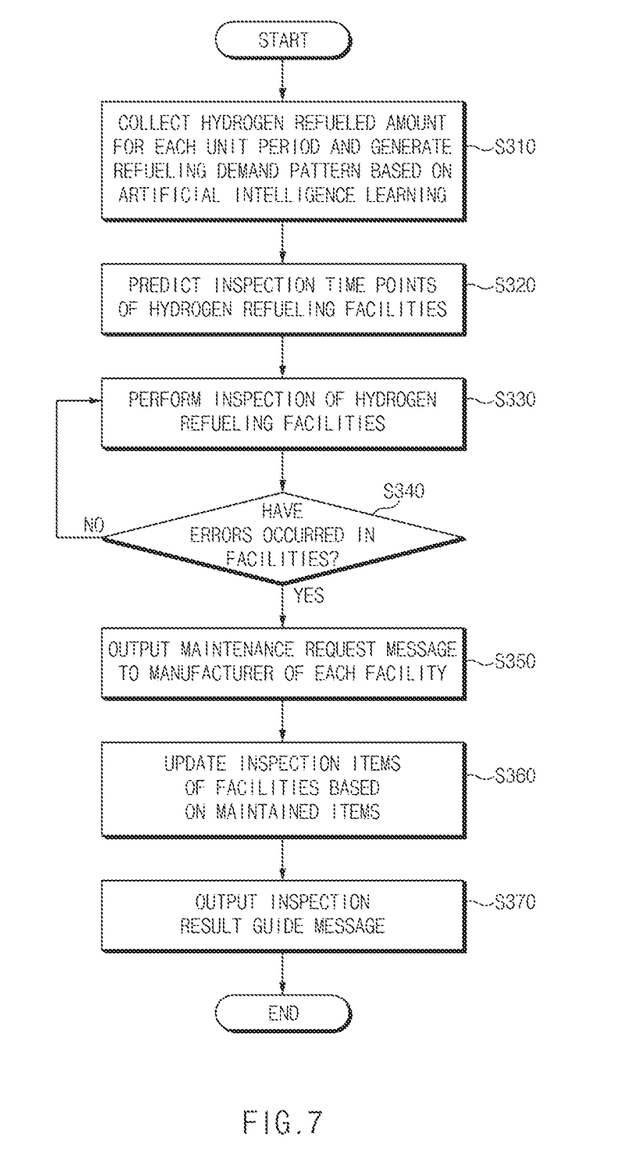
FIG. 7 is a flowchart illustrating a hydrogen refueling control method according to another embodiment of the present disclosure.

FIG. 7 is a flowchart illustrating a hydrogen refueling control method according to another embodiment of the present disclosure.

As shown in FIG. 7, the controller 150 may collect the hydrogen refueled amount for each unit period, and generate the refueling demand pattern based on the artificial intelligence learning at S310.

The controller 150 may predict the inspection time points of the hydrogen refueling facilities based on the refueling demand pattern at S320.

According to an embodiment, in S320, the controller 150 may predict the time point (e.g., the peak time point) at which the hydrogen refueled amount is maximum based on the refueling demand pattern, and predict the time points included in the time points other than the time point at which the hydrogen refueled amount is maximum as the inspection time points of the hydrogen refueling facilities. However, the present disclosure may not be limited thereto, and the controller 150 may predict the inspection time points of the hydrogen refueling facilities based on the operating schedule.

The controller 150 may allow the inspection to be performed at the predicted inspection time points at S330.

The controller 150 may determine whether the errors have occurred in the hydrogen refueling facilities during the inspection at the predicted inspection time points at S340.

When it is determined in S340 that the errors have occurred in the hydrogen refueling facilities, the controller 150 may directly make a request for the maintenance to the manufacturer by outputting the maintenance request message to the manufacturer of each hydrogen refueling facility at S350.

When it is determined that the maintenance is completed by the manufacturer, the controller 150 may make a request for the maintained items to the manufacturer, receive the maintained items from the manufacturer, and update the inspection items of the facilities based on the maintained items at S360.

The controller 150 may output the message for indicating the inspection results via the output device 153 at S370.

As described above, the controller 150 may reduce the existing situation in which the refueling facilities are not able to be operated as much as the time period during which the operator determines whether the operator is able to solve the errors of the hydrogen refueling facilities from the time point at which the errors have occurred in the hydrogen refueling facilities, and the operator make a request for the maintenance to the manufacturer of each hydrogen refueling facility when it is determined that the operator is not able to solve the errors of the hydrogen refueling facilities.

Figure 8:
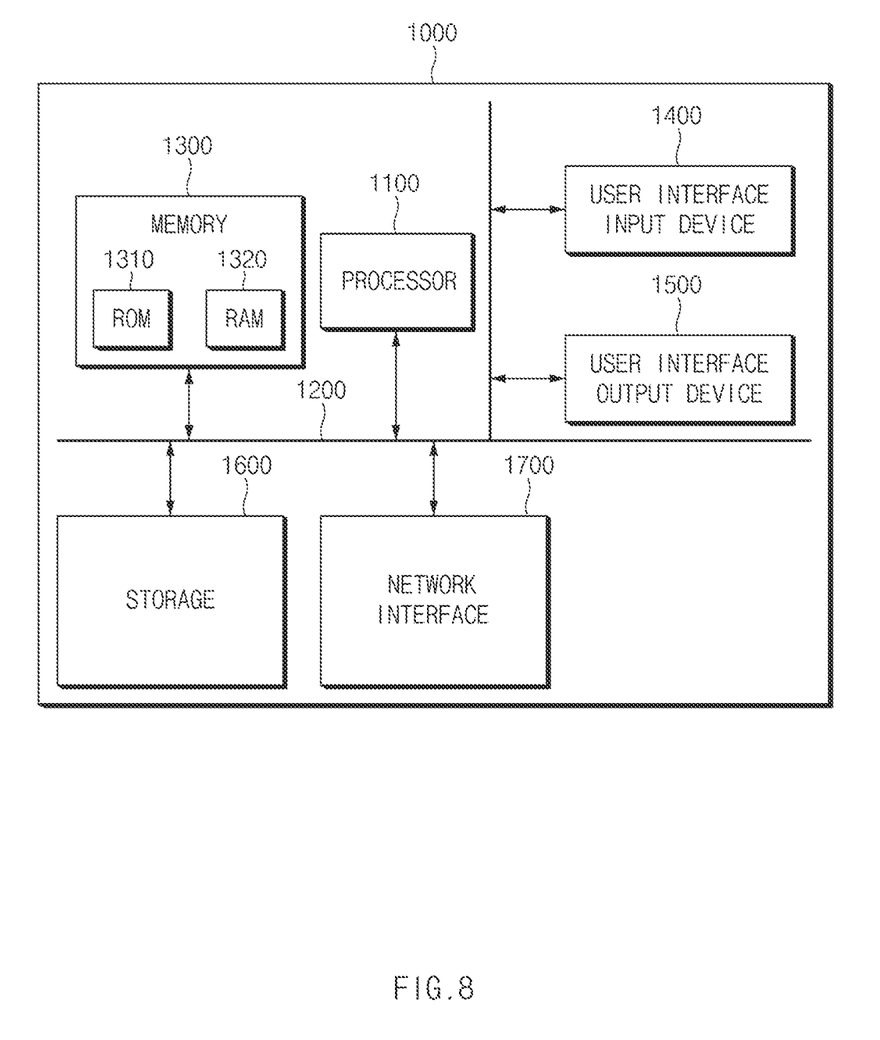
FIG. 8 is a diagram illustrating a configuration of a computing system for implementing a method according to an embodiment of the present disclosure.

FIG. 8 is a diagram illustrating a configuration of a computing system for implementing a method according to an embodiment of the present disclosure.

With reference to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling refueling of hydrogen according to one embodiment of the present disclosure may operate and manage all of the facilities in the hydrogen refueling station in the unified manner to allow a new business operator without experience in operating the hydrogen refueling station to easily operate the hydrogen refueling station, thereby accelerating construction of a hydrogen refueling station infrastructure.

The device and the method for controlling refueling of hydrogen according to one embodiment of the present disclosure may minimize the customer inconvenience by quickly coping with the unexpected situation in operating the hydrogen refueling station.

The device and the method for controlling refueling of hydrogen according to one embodiment of the present disclosure may reduce operating labor costs, and prevent the failures in advance and respond to the failures via the real-time monitoring and the inspection to reduce maintenance costs, thereby increasing an operational efficiency.

The device and the method for controlling refueling of hydrogen according to one embodiment of the present disclosure may store refueling station operation information in a database to create a consulting or license business related to the hydrogen refueling station operation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A device for controlling refueling of hydrogen, the device including:
    one or more hydrogen refueling facilities configured to refuel a hydrogen-powered vehicle with hydrogen; and
    a controller configured to:
    collect state information and control data of the hydrogen refueling facilities;
    perform artificial intelligence learning based on the state information and the control data;
    control operations of the hydrogen refueling facilities based on the artificial intelligence learning result; and
    learn a time point for controlling a compressor, a time point for cooling hydrogen, and a time point at which a user requests refueling.

2. The device of claim 1, wherein the controller includes:
    a communication device configured to receive the state information sensed by a plurality of sensors equipped in the hydrogen refueling facilities and the control data of the hydrogen refueling facilities;
    an input device configured to receive an input of an operator;
    an output device configured to output a guide message to the operator;
    storage configured to store the control data of the hydrogen refueling facilities; and
    a control device configured to perform the artificial intelligence learning based on the state information and the control data.

3. The device of claim 1, wherein the hydrogen refueling facilities include:
a compressor configured to compress hydrogen output from a tube trailer for supplying hydrogen;
a storage container configured to store compressed hydrogen output from the compressor;
a cooler configured to cool hydrogen stored in the storage container; and
a dispenser configured to output cooled hydrogen to the hydrogen-powered vehicle.

4. The device of claim 1, wherein the controller is configured to derive an operating schedule of the hydrogen refueling facilities based on the learning result, and to output the operating schedule to the operator.

5. The device of claim 4, wherein the controller is configured to:
predict a pressure of a tube trailer based on the operating schedule;
predict a time point when the pressure of the tube trailer is lower than a preset tube trailer replacement required pressure as a replacement time point; and
output a guide message requesting that a new tube trailer is supplied at the replacement time point.

6. The device of claim 5, wherein the controller is configured to update the operating schedule based on the control data generated in a process of refueling the hydrogen-powered vehicle with hydrogen output from the new tube trailer when it is determined that the tube trailer is replaced with the new tube trailer.

7. The device of claim 4, wherein the controller is configured to:
predict inspection time points of the hydrogen refueling facilities based on the operating schedule; and
output a maintenance request message to a manufacturer of each the hydrogen refueling facilities when it is determined that replacement of the hydrogen refueling facilities is necessary after performing inspection at the inspection time points.

8. The device of claim 7, wherein the controller is configured to:
receive maintained items from the manufacturer of each of the hydrogen refueling facilities; and
update inspection items of the hydrogen refueling facilities based on the maintained items.

9. The device of claim 8, wherein the controller is configured to output a message indicating the inspection results when it is determined that the inspection items of the hydrogen refueling facilities have been updated.

10. The device of claim 1, wherein the controller is configured to:
collect a hydrogen refueled amount refueled to the hydrogen-powered vehicle for each unit period; and
generate a refueling demand pattern based on the collected hydrogen refueled amount information.

11. The device of claim 10, wherein the controller is configured to:
predict a time point when the hydrogen refueled amount is maximum based on the refueling demand pattern; and
predict time points, excluding the time point when the hydrogen refueled amount is maximum, as inspection time points of the hydrogen refueling facilities.

12. A method for controlling refueling of hydrogen, the method including:
collecting, by a controller, state information and control data of one or more hydrogen refueling facilities for refueling a hydrogen-powered vehicle with hydrogen;
performing, by the controller, artificial intelligence learning based on the state information and the control data, and controlling operations of the hydrogen refueling facilities based on the artificial intelligence learning result; and
learning, by the controller, a time point for controlling a compressor, a time point for cooling hydrogen, and a time point at which a user requests refueling.

13. The method of claim 12, further including:
deriving, by the controller, an operating schedule of the hydrogen refueling facilities based on the artificial intelligence learning result, and outputting the operating schedule to an operator.

14. The method of claim 13, further including:
predicting, by the controller, a pressure of a tube trailer based on the operating schedule;
predicting, by the controller, a time point when the pressure of the tube trailer is lower than a preset tube trailer replacement required pressure as a replacement time point; and
outputting, by the controller, a guide message requesting that a new tube trailer is supplied at the replacement time point.

15. The method of claim 14, further including:
updating, by the controller, the operating schedule based on the control data generated in a process of refueling the hydrogen-powered vehicle with hydrogen output from the new tube trailer when it is determined that the tube trailer is replaced with the new tube trailer.

16. The method of claim 14, further including:
predicting, by the controller, inspection time points of the hydrogen refueling facilities based on the operating schedule; and
outputting, by the controller, a maintenance request message to a manufacturer of each the hydrogen refueling facilities when it is determined that replacement of the hydrogen refueling facilities is necessary after performing inspection at the inspection time points.

17. The method of claim 16, further including:
receiving, by the controller, maintained items from the manufacturer of each of the hydrogen refueling facilities, and updating inspection items of the hydrogen refueling facilities based on the maintained items.

18. The method of claim 17, further including:
outputting, by the controller, a message indicating the inspection results when it is determined that the inspection items of the hydrogen refueling facilities have been updated.

19. The method of claim 12, further including:
collecting, by the controller, a hydrogen refueled amount refueled to the hydrogen-powered vehicle for each unit period, and generating a refueling demand pattern based on the collected hydrogen refueled amount information.

20. The method of claim 19, further including:
predicting, by the controller, a time point when the hydrogen refueled amount is maximum based on the refueling demand pattern, and predicting time points, excluding the time point when the hydrogen refueled amount is maximum, as inspection time points of the hydrogen refueling facilities.

* * * * *